(12) United States Patent
Iikubo

(10) Patent No.: US 7,413,722 B2
(45) Date of Patent: Aug. 19, 2008

(54) METHOD AND APPARATUS FOR MANUFACTURING NITROGEN TRIFLUORIDE

(75) Inventor: Yuichi Iikubo, West Lafayette, IN (US)

(73) Assignee: Foosung Co., Ltd., Seoul (KR)

( * ) Notice: Subject to any disclaimer, the term of this patent is extended or adjusted under 35 U.S.C. 154(b) by 11 days.

(21) Appl. No.: 11/196,354

(22) Filed: Aug. 4, 2005

(65) Prior Publication Data

US 2007/0031315 A1    Feb. 8, 2007

(51) Int. Cl.
*C01B 21/083* (2006.01)
*C01B 7/19* (2006.01)

(52) U.S. Cl. ........................ 423/406; 423/483

(58) Field of Classification Search ................ 423/406, 423/483
See application file for complete search history.

(56) References Cited

U.S. PATENT DOCUMENTS

| | | | |
|---|---|---|---|
| 3,043,662 A | | 7/1962 | Lipscomb et al. |
| 3,055,817 A | | 9/1962 | Gordon et al. |
| 3,304,248 A | | 2/1967 | Fullam et al. |
| 4,001,380 A | | 1/1977 | Gordon et al. |
| 4,091,081 A | * | 5/1978 | Woytek et al. ............. 423/406 |
| 4,543,242 A | | 9/1985 | Aramaki et al. |
| 4,804,447 A | | 2/1989 | Sartori |
| 4,975,259 A | | 12/1990 | Hyakutake et al. |
| 5,628,894 A | | 5/1997 | Tarancon |
| 5,637,285 A | | 6/1997 | Coronell et al. |
| 6,010,605 A | | 1/2000 | Tarancon |
| 6,183,713 B1 | | 2/2001 | Tokunaga et al. |
| 6,361,679 B1 | | 3/2002 | Kikkawa et al. |
| 6,908,601 B2 | * | 6/2005 | Satchell et al. ............. 423/406 |
| 6,984,366 B2 | * | 1/2006 | Syvret et al. ................ 423/406 |
| 6,986,874 B2 | * | 1/2006 | Satchell et al. ............. 423/406 |
| 7,045,107 B2 | * | 5/2006 | Dholakia et al. ........... 423/406 |
| 7,074,378 B2 | * | 7/2006 | Hart et al. .................. 423/406 |
| 7,128,885 B2 | * | 10/2006 | Satchell, Jr. ................ 423/406 |
| 2004/0096386 A1 | * | 5/2004 | Syvret et al. ................ 423/406 |

FOREIGN PATENT DOCUMENTS

| | | |
|---|---|---|
| JP | 62-104656 | 11/1988 |
| JP | 63-014725 | 1/1989 |
| JP | 62-277514 | 5/1989 |
| JP | 01-074105 | 10/1990 |
| JP | 01-074106 | 10/1990 |
| JP | 01-334811 | 10/1990 |

(Continued)

*Primary Examiner*—Wayne Langel
(74) *Attorney, Agent, or Firm*—Marshall, Gerstein & Borun LLP

(57) ABSTRACT

A method and apparatus for manufacture of $NF_3$ by gas-liquid phase reaction of fluorine and ammonia in molten ammonium acid fluoride (AAF) in a static reactor in which the reactants are conveyed primarily by thermal conduction or siphon. Optimally, the reactor contains one or more static mixing elements with little, if any, mechanical agitation. Reactant flow rate and reaction temperature are regulated by the rate of introduction of ammonia and cooling, as necessary The ratio of hydrogen fluoride (generated by the reaction) to ammonia in the reactor is significantly lower than taught in the prior art. This allows a lower reaction temperature. The present invention is an improved synthetic method that offers enhanced selectivity and higher yields, improved control of reaction kinetics, reduced operational and energy costs, and a greater margin of safety.

23 Claims, 1 Drawing Sheet

FOREIGN PATENT DOCUMENTS

| | | |
|---|---|---|
| JP | 01-074107 | 7/1991 |
| JP | 01-307242 | 7/1991 |
| JP | 01-307243 | 7/1991 |
| JP | 02-033457 | 10/1991 |
| JP | 02-033458 | 10/1991 |
| JP | 02-110167 | 2/1992 |
| JP | 02-164031 | 2/1992 |
| JP | 03-215187 | 2/1993 |
| JP | 03-215188 | 2/1993 |
| JP | 03-211917 | 3/1993 |
| JP | 3037463 | 3/1993 |
| JP | 03-274206 | 4/1993 |
| JP | 3037464 | 6/1993 |
| JP | 3043243 | 5/1996 |
| JP | 3162588 | 5/1996 |
| JP | 3043251 | 7/1996 |
| JP | 09-357666 | 7/1999 |
| JP | 10-137144 | 12/1999 |
| JP | 10-141710 | 12/1999 |
| JP | 10-232049 | 2/2000 |
| JP | 11-030333 | 2/2000 |
| JP | 10-247239 | 3/2000 |
| JP | 2000-029044 | 10/2000 |
| JP | 10-278799 | 11/2000 |
| JP | 11-237912 | 3/2001 |
| JP | 3550074 | 10/2001 |
| JP | 2000-139846 | 11/2001 |
| JP | 2001-376685 | 7/2002 |
| JP | 2002-131823 | 11/2002 |
| JP | 2003-029347 | 8/2003 |
| JP | 2003-388952 | 6/2004 |

* cited by examiner

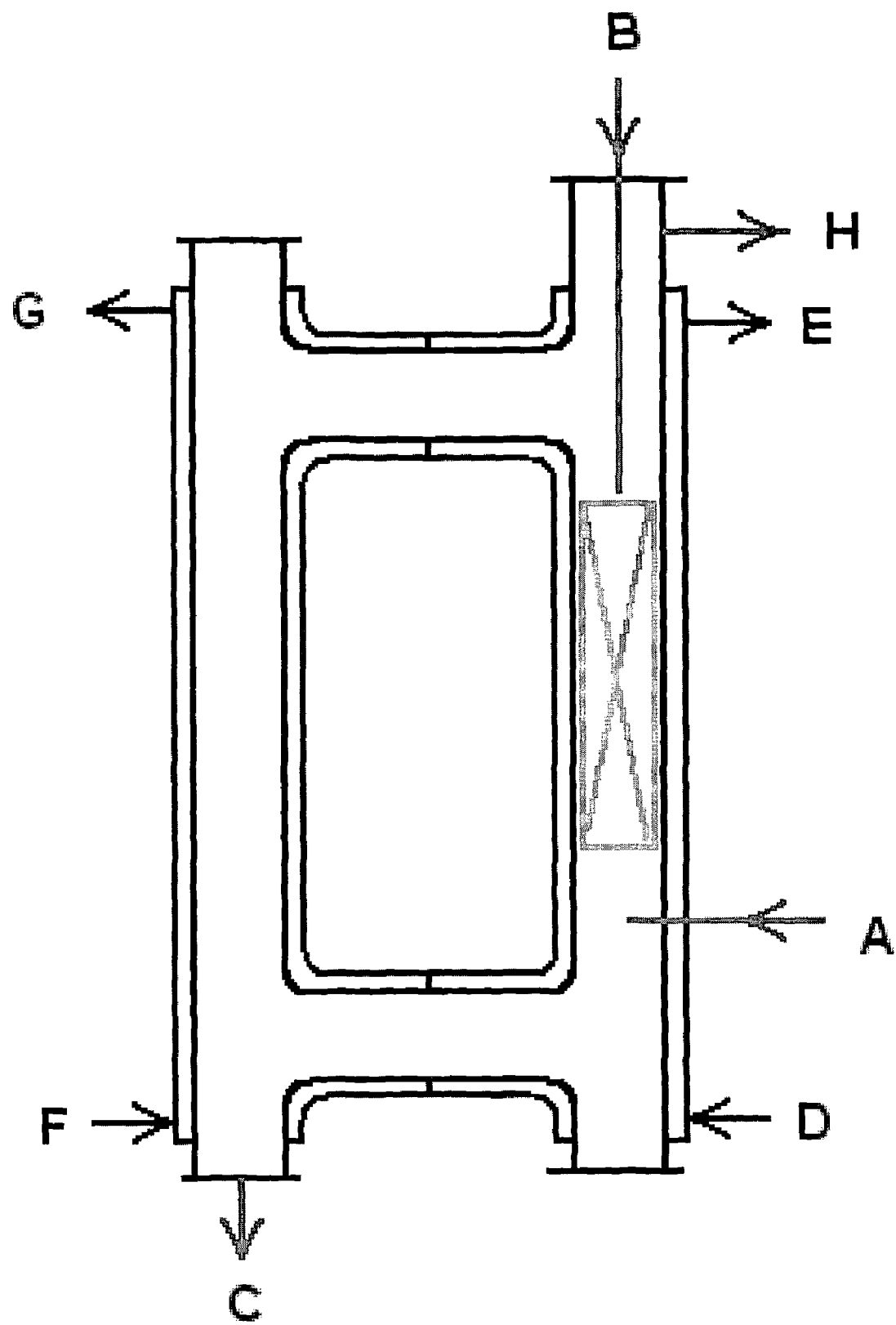

METHOD AND APPARATUS FOR MANUFACTURING NITROGEN TRIFLUORIDE

BACKGROUND OF THE INVENTION

The present invention is directed to a method and apparatus for the manufacture of nitrogen trifluoride ($NF_3$) by reacting elemental fluorine ("$F_2$"), gaseous ammonia ("$NH_3$") and a molten ammonium acid fluoride ("AAF"). In the preferred embodiment, the method and apparatus concurrently produces co-product ammonium bifluoride ($NH_4HF$, "ABF") that is salable after removal of excess hydrogen fluoride ("HF").

The reaction is accomplished in a static reactor without significant mechanical agitation that may contain static mixing elements and that may be configured in a closed loop. The present invention increases reaction selectivity and yield of nitrogen trifluoride while minimizing creation of undesired and unstable by-products and, simultaneously, reducing operational costs and improving control over reaction kinetics.

In the preferred embodiment, flow of reactants is accomplished without adding significant energy to the process (for mixing or pumping, for example) in excess of the energy required to remove the heat of reaction.

The rate of introduction of the reactants and the maintenance of a proper temperature along the length of the reactor controls reaction temperature. $NF_3$ is used in many industries, for example, in semiconductor manufacturing; flat display panel cleaning; as a fluorine source in the preparation of fluorocarbons; and as an oxidizing agent for high energy fuels. $NF_3$ has advantages over elemental fluorine and competing products in these and other applications because it is relatively inert at low temperatures, e.g., 300° F. or below, and, therefore safer and more convenient to handle. Further, $NF_3$ can safely be compressed to high pressures, e.g., 1,700 psig for shipment.

In contrast to the present invention, known methods of producing $NF_3$ demonstrate poorer yields and are less efficient. The three principal known methods for manufacturing $NF_3$ are as follows:

1. reaction of a fluorine gas reactant, a gaseous ammonia reactant and an acidic AAF ($NH_4Fx$ HF where the ratio of $NH_3$ to HF is approximately 1:2.55 or greater, preferably 1:2.65 or greater or 1:2.85 or greater, in an agitated reactor with a flat blade turbine operating at power levels of 5000 watts per cubic meter of reactor volume, preferably more than 35,000 watts per cubic meter of reactor volume;

2. an electrolytic method such as (1) utilizing a molten flux of $NH_3$, a metal fluoride, and HF, and circulating the molten flux from an electrolyzer, to an ammonia solubilizer, to an $NF_3$ reactor, to an HF solubilizer, and back to the electrolyzer; or (2) molten salt electrolysis using a metal electrode and ammonium hydrogen fluoride as an electrolyte; and 3. direct fluorination (DF) of $NH_3$ with $F_2$ or gas-phase reaction of $NH_3$ with $F_2$ with inert diluents. In addition to these three principal methods, other unique methods of manufacturing $NF_3$ are also described below.

These known manufacturing methods have yields that are typically lower than those achieved by the present invention. Additionally, in contrast to the present invention, Method 1 (as currently practiced)—the most widely practiced method—suffers from greater corrosion of the reactor, and reaction kinetics that are more difficult to control, in part because the shear induced by mechanical agitation increases the surface area of gaseous reactants resulting in an increase of un-reacted $F_2$ gas.

Moreover, in contrast to the present invention, Method 2 (electrolysis) is economically less efficient because it requires use of an electrolytic cell with nickel anodes. These anodes suffer substantial corrosion and the process, therefore, requires frequent maintenance not required by the present invention. Additionally, the energy costs for Method 2 are higher than those of the present invention and the quality of the $NH_3$ product is lower than that of the present invention because of metal ion contaminants. Finally, use of Method 2 results in a substantial expense for nickel anodes, an expense that the present invention avoids.

Method 3 is the subject of several Japanese patent applications, but in comparison to the present invention, is difficult to control except in a lab scale because the gas-phase fluorination of $NH_3$ is highly exothermic and reaction kinetics are more difficult to control than with a gas-liquid phase reaction such as that of the present invention. Also, previous attempts to produce $NF_3$ by the direct fluorination method, (3), and by direct fluorination of $NH_3$ in molten ABF resulted in yields substantially lower than those of the present invention.

Competing Chemical Reactions

The basic competing reactions are as follows:

$3F_2 + NH_3 \rightarrow NF_3 + 3HF$                 Reaction 1

$3F_2 + 2NH_3 \rightarrow N_2 + 6HF$                 Reaction 2

$4F_2 + 2NH_3 \rightarrow N_2F_2 + 6HF$               Reaction 3

$4F_2 + 2NH_3 + H_2O \rightarrow N_2O + 8HF$           Reaction 4

Reaction 1 is the desired reaction. Reaction 2 is most favored thermodynamically, but produces only undesirable $N_2$ and HF. Minimizing reaction 2 requires minimizing the reaction temperature, since lower reaction temperatures favor Reaction 1. Reaction 3 produces $N_2F_2$, which is unstable and a significant safety hazard, and large quantities of undesired HF. Reaction 4 results from poor quality $NH_3$ and $F_2$.

Currently, the most commonly used process for producing $NF_3$ is described in U.S. Pat. No. 5,637,285 ("the '285 patent"). As described in the '285 patent, $NF_3$ is produced by the direct fluorination of ammonium ions by contacting gaseous $F_2$ with a liquid phase acidic ammonium acid fluoride ($NH_4Fx$ HF where x is 2.55 or greater, and preferably greater than 2.65 or 2.85) while $NH_3$ is separately contacted with the liquid-phase AAF to generate ammonium ions. In contrast to the present invention, this process typically gives $NF_3$ yields of 65% to 90%, but only at an elevated mixing rate in a stirred reactor at operating temperatures of 260° F. to 400° F. (126.7° C. to 204.4° C.), preferably 260° F.-320° F. (126.7° C. to 160° C.), with lower temperatures favoring Reaction 1. The $F_2$ is contacted with liquid phase AAF by using a specially designed sparger, having a plurality of small holes, and the contact is enhanced by mechanical agitation with a flat blade turbine.

Compared to the present invention, this process has lower selectivity and yield of $NF_3$. In contrast to the present invention (which uses a static reactor with reactants conveyed by thermal conduction and siphon across static mixing elements with minimal, if any mechanical agitation, that is substantially self-regulating so long as proper operational temperature is maintained), the process described in the '285 patent (introduction of the $F_2$ and $NH_3$ through spargers with a plurality of small holes) makes reaction kinetics more difficult to control because the agitator blades induce shear and because of the large surface area of the gaseous reactants (because of the sparger design with a plurality of small holes). Additionally, in comparison to the static reactor design of the present invention, the operational and maintenance costs of the process described in the '285 patent are higher since the process requires 5,000 to 35,000 watts/cubic meter, typically 35,000 watts/cubic meter of reactor volume for agitation in addition to the energy required to remove the heat of reaction. The sub-optimal reaction conditions of the process described in the '285 patent relative to the present invention, particularly the higher acidity of the molten AAF, which necessitates higher operating temperatures, and the use of spargers with a plurality of small holes to introduce gaseous reactants and mechanical agitation, result in the production of greater volumes of one or more undesired by-products ($N_2$, $N_2F_2$, $N_2O$ and HF). In summary, the present invention: (i) utilizes a less acidic AAF, allowing operation at lower temperature, (ii) utilizes static mixing elements and little, if any, mechanical agitation, and, thus, avoids significant energy requirements in excess of those necessary to remove the heat of reaction and the maintenance costs of mechanical agitation, (iii) relies on thermal siphon or conduction of reactants, which provides improved control over reaction kinetics, and (iv) avoids the use of materials of construction with the potential to introduce contaminants in the product.

Similarly, Japanese patent application 2001-376685 teaches a method for producing $NF_3$ comprised of introducing a fluorine-containing supplying material flow into contact with liquid acidic ammonium fluoride in an agitated reactor for a fixed time. In contrast, the present invention: (i) utilizes static mixing elements and little, if any, mechanical agitation, and, thus, avoids significant energy requirements in excess of those necessary to remove the heat of reaction and the maintenance costs of mechanical agitation, (ii) relies on thermal siphon or conduction of reactants, which provides improved control over reaction kinetics, and (iv) avoids the use of materials of construction with the potential to introduce contaminants in the product.

U.S. Pat. No. 5,628,894 discloses a method for the production of $NF_3$ and hydrogen (H.sub.2) gas, starting with a molten flux including at least $NH_3$, a metal fluoride, and HF, including the steps of: circulating the molten flux from an electrolyzer, to an ammonia solubilizer, to an $NF_3$ reactor, to an HF solubilizer, and back to the electrolyzer; maintaining the quantity of the molten flux substantially constant by adding $NH_3$ and a carrier gas to the $NH_3$ solubilizer and by adding HF and a carrier gas to the HF solubilizer; producing $F_2$ gas and H2 gas in the electrolyzer; transferring the carrier gas from at least one of the solubilizers to the $NF_3$ reactor; mixing the $F_2$ gas and the carrier gas and supplying the mixed gases to the $NF_3$ reactor; reacting the $F_2$ gas with the molten flux in the $NF_3$ reactor to produce $NF_3$. The present invention does not require complex apparatus such as a flux tank, HF solubilizer, ammonium solubilizer, compressor, condenser, $NF_3$ flux loop and a fluoride flux loop. Additionally, the energy requirements of the present invention are limited to those necessary to remove the heat of reaction and no energy for electrolysis is required.

U.S. Pat. No. 6,361,679 discloses a process for producing high-purity $NF_3$ gas by molten salt electrolysis using a nickel electrode and $NH_4HF$ as an electrolyte, wherein $CF_4$ impurity gas entrained in a crude gas, among impurities in the nickel electrode as an anode is controlled to an amount of 400 wt % or less. In contrast, the present invention achieves comparable purity without the use of nickel or carbon electrodes and thereby avoids both metal and significant $CF_4$ impurities. Additionally, the energy requirements of the present invention are limited to those necessary to remove the heat of reaction and no energy for electrolysis is required.

U.S. Pat. No. 6,010,605 discloses an apparatus for the production of $NF_3$, starting with an anhydrous molten flux including $NH_3$, a metal fluoride (AAF), and HF. The apparatus includes an electrolyzer, an $NH_3$ solubilizer, an HF solubilizer, an $NF_3$ reactor, two compressors, two pumps, three condensers a gas recycle loop, and, two flux loops of the same component ternary flux, but each loop with different concentration. The present invention does not require complex apparatus such as an electrolyzer, an $NH_3$ solubilizer, an HF solubilizer, an $NF_3$ reactor, two compressors, two pumps, three condensers a gas recycle loop, and, two flux loops and a flux tank. Additionally, the energy requirements of the present invention are limited to those necessary to remove the heat of reaction and no energy for electrolysis is required.

U.S. Pat. No. 6,183,713 discloses a method for producing $NF_3$ by gas-solid reaction of a fluorine-containing gas with particulate solid of an ammonium complex of a metal fluoride. This method includes the steps of (a) providing a packed-bed-type vessel filled with a particulate solid of an ammonium complex of a metal fluoride; (b) introducing a fluorine-containing gas into the vessel to allow the fluorine-containing gas to flow upwardly through the vessel such that fluorine of the fluorine-containing gas is reacted with the particulate solid in the vessel, thereby to obtain a reaction gas containing $NF_3$; and (c) separating the $NF_3$ from the reaction gas. The present invention does not use an ammonium complex of a metal fluoride, thus avoiding potential metal impurities in the product and the present invention is conducted in liquified $NH_4HF$ with the introduction of both $NH_3$ and $F_2$. This provides the advantage of producing $NH_4HF$ and HF as salable co-products.

U.S. Pat. No. 4,091,081 discloses a method for preparing $NF_3$ is prepared by passing $F_2$, optionally with an inert diluent, in intimate contact with liquid phase ammonium acid fluoride, preferentially in a nickel reactor, maintained at a temperature above its melting point but below about 400° F. (204.4° C.) for a time sufficient to effect reaction. The intimate contact is achieved using a sparger with a plurality of small holes. Generally, $NH_3$ is injected into the ammonium acid fluoride along with the $F_2$ to maintain a molar ratio of by-product HF to ammonia of approximately 2.0 to 2.5. The essence of this invention is the use of the sparger with the plurality of small holes and the maintenance of a molar ratio of HF to $NH_3$ to maintain the desired acidity of the ammonium acid fluoride and avoid formation of ammonium fluoride. In contrast, the present invention: does not employ a special sparger of the type described and, thus, avoids the materials of construction, corrosion and maintenance problems encountered with such a sparger and the difficulties in controlling reaction kinetics that result from the greater surface area of the gaseous reactant introduced using such a sparger. Additionally, in contrast to the process described in the '081 patent, the present invention employs thermal conduction and siphon to convey reactants across static mixing elements with little, if any, mechanical agitation, and, thus, avoids significant energy requirements in excess of those necessary to remove the heat of reaction and the maintenance costs of mechanical agitation. Moreover, again in contrast to the process described in the '081 patent, the present invention's reliance on thermal siphon or conduction of reactants provides improved control over reaction kinetics as long as a proper operational temperature is maintained. Finally, in contrast to the process described in the '081 patent, the present invention does not employ the use of diluents, and thereby avoids the complications and cost associated with their use.

U.S. Pat. No. 4,543,242 ("the '242 patent") discloses a synthesis of $NF_3$ similar to that described in the '285 patent using $F_2$ and solid $(NH_4)_3 AlF_6$. The asserted yield of $NF_3$ was in the range of 65-78%, based upon $F_2$ selectivity. The present invention does not employ metal ammonium fluoride complexes and, therefore, avoids potential metal impurities in the product.

Electrolytic processes are described in U.S. Pat. Nos. 4,804,447 and 4,975,259, Japanese patents 3550074, 3043251, 3043243, 3162588, 3037464, 3037463, and Japanese patent applications 2000-388841, 11-237912, 2000-029044, 10-278799, 10-247239, 10-232049, 10-137144, 10-141710, 09-357666, 03-211917, 03-215188, 03-215187, 02-164031, 02-110167, 02-033458, 02-033457, 01-334811, 63-014725, 62-277514 and 62-104656. Electrolytic processes require energy in excess of that necessary to remove the heat of reaction and, therefore, are less efficient in contrast to the present invention, which does not require energy substantially in excess of that necessary to remove the heat of reaction. Electrolytic processes also have the potential to introduce impurities from the anodes into the product while the present invention avoids this problem.

Gas phase reactions of ammonia and fluorine are described in Japanese patent applications 2002-131823, 2000-139846, 03-274206, 01-074107, 01-074106, 01-074105. In comparison to the present invention, direct gas phase reactions are difficult to control except in a lab scale because the gas-phase fluorination of $NH_3$ is highly exothermic and reaction kinetics are more difficult to control than with a gas-liquid phase reaction such as that of the present invention. Many of the gas phase processes use diluents such as perfluorocarbons or helium. The present invention is preferable to such processes because it avoids the cost of diluents that do not contribute to the reaction. Also, processes that produce $NF_3$ by direct fluorination, and by gas-phase fluorination of $NH_3$ in the presence of ABF have yields substantially lower than those of the present invention.

U.S. Pat. No. 3,304,248 discloses a process for forming nitrogen trifluoride by passing gaseous nitrogen through a plasma arc at a temperature in excess of 1,000° C. and introducing gaseous elemental fluorine into the post arc region as near the anode as possible. The molar ratio of nitrogen to fluorine during such process is maintained in excess of 0.4:1. In contrast to the '248 patent, the present invention does not employ a plasma arc and, thus, the energy requirements of the present invention are limited to those necessary to remove the heat of reaction. In comparison to the present invention, gas phase reactions are difficult to control except in a lab scale because the direct gas-phase fluorination of $NH_3$ is highly exothermic and reaction kinetics are more difficult to control than with a gas-liquid phase reaction such as that of the present invention.

U.S. Pat. No. 3,055,817 discloses a process for producing nitrogen trifluoride by reacting hydrazoic acid gas with oxygen difluoride in the presence of actinic (ultraviolet) radiation. In contrast, the present invention avoids the use of hydrazoic acid gas, which is difficult to synthesize and unstable, and also avoids the need to synthesize or procure oxygen difluoride. Additionally, the present invention avoids the energy requirements for producing actinic radiation.

U.S. Pat. No. 4,001,380 discloses an improved process for preparing nitrogen trifluoride from by reaction with nitrosyl fluoride or chlorine trifluoride at a temperature above the boiling point of fluorine azide but below 100° C. The present invention avoids the need to synthesize or procure nitrosyl fluoride or chlorine trifluoride, both of which are materially more costly than $NH_3$ and $F_2$.

U.S. Pat. No. 3,043,662 discloses a process for preparing nitrogen trifluoride by reacting carbon tetrafluoride or carbonyl fluoride with binary oxides of nitrogen, e.g. nitrous, nitric and nitrogen oxide. The reaction is carried out by passing the gases through an electric arc at a temperature of 2,000° C. to 4,000° C. for a period of 0.001 to about 2 seconds. In contrast, the present invention avoids the need to synthesize or procure carbon tetrafluoride or carbonyl fluoride and oxides of nitrogen, all of which are materially more costly than $NH_3$ and $F_2$. By avoiding the use of carbon tetrafluoride or carbonyl fluoride, the present invention—in contrast to the process described in the '662 patent—minimizes, or eliminates, generation of carbon trifluoride as an impurity in the product. Additionally, in contrast to the process described in the '662 patent, the present invention avoids the energy requirements for producing an electric arc and the use of costly materials of construction capable of sustaining the reaction temperatures in the electric arc process.

Japanese patent application 2003-388952 describes a method of manufacturing $NF_3$ from a fluorine reactant and an ammonium ion source dispersed in a liquid phase reaction mixture containing one or more perfluorocarbon fluids. The present invention does not require the use of perfluorocarbon fluids and the present invention gives yields substantially higher than the 80% yield claimed for this process.

Japanese patent application 2003-029347 describes a method of producing $NF_3$ comprised of passing a working fluid through a heat engine cycle and using mechanical energy generated by the working fluid to produce a sufficient mixing intensity inside a nitrogen trifluoride reactor. This method utilizes a working fluid vapor jet, such as hydrogen fluoride vapor jet, to impart sufficient energy to the mixing zone of the reactor in order to disperse gaseous fluorine into an ammonium acid fluoride melt. A gaseous reaction product flow, containing $NF_3$ and the working vapor fluid, is removed from the reactor. The working fluid is then separated and recycled for reuse in the process. The present invention, by contrast, does not require a complex vapor or the separation and recycling of the liquid reaction medium.

Japanese patent application 11-030333 teaches a process to produce $NF_3$ by introducing a gas containing $F_2$ through the lower part of a vertical reactor filled with particles of an ammonium complex of metal fluoride such as ($NH_3AlF_6$ in a packed layer reactor so as to allow the gas to react with the complex. The $NF_3$ concentration is increased by partially recirculating and reintroducing the gas discharged from the reactor after removing impurities such as $F_2$, HF, $N_2O$. In contrast, the present invention does not require use of an ammonium complex of metal fluorides, which are more expensive than ABF or AAF. Further, it does not require successive purification and recirculation of the gas from the reaction and avoids the cost and complexity of purification apparatus, compressors and blowers for this purpose at the production stage.

A process for producing $NF_3$ by introducing $F_2$ gas into a perfluorocarbon liquid containing dissolved $NH_3$ or by introducing $NH_3$ gas into a perfluorocarbon liquid containing dissolved $F_2$ is described in Japanese patent application 01-307243. In contrast to this process, the present invention avoids the cost of perfluorocarbon as a liquid medium and the energy requirements to maintain a liquid phase reaction and for distillation of the product from the reaction medium.

Japanese patent application 01-307242 describes a process for manufacturing $NF_3$ by reacting a metal fluoride (e.g. $CoF_3$, $AgF_2$ or $MnF_3$) and/or a metal fluoride composite salt (e.g. $CoF_3.KF$) with $NH_3$ and $F_2$, preferably at 50-450° C. The present invention avoids both the cost of metal fluorides or metal fluoride composite salts and the potential for metal contamination in the product.

The prior art has failed to produce $NF_3$ in yields or efficiencies in the range achieved by the present invention. With the increased demand for $NF_3$ for the electronics industry, a need has arisen to for greater $NF_3$ production capacity. At the higher energy and capital costs of larger production plants, it is increasingly important to achieve the highest yields and efficiencies. The present invention achieves unexpectedly high yields and efficiencies as described in more detail to follow.

BRIEF DESCRIPTION OF THE DRAWING

The drawing is a side view of a closed loop reactor used to manufacture $NF_3$ in accordance with the present invention.

BRIEF SUMMARY OF THE INVENTION

The present invention efficiently produces high yields of $NF_3$ in a novel reactor without significant mechanical agitation in which $F_2$ and $NH_3$ are introduced into the reactor through conduits or nozzles into liquefied, less acidic AAF reactant ($NH_4Fx$ HF where the ratio of $NH_3$ to HF is approximately 1:2.28-1:2.55). This maximizes Reaction 1 over the competing reactions and optimizes selectivity of the production of $NF_3$ to the production of undesired byproducts.

Cooling can be through reactor-external coolant-carrying jacket(s) partially or totally encircling the reactor in intimate contact with exterior surfaces of the reactor, separate flow channels in intimate contact with exterior surfaces of the reactor, or internal cooling apparatus within the reactor (which may be integrated into the construction of any static mixing elements that may be used). The liquid AAF, reactants and reaction products flow, primarily by convection or thermal siphon with minimal, if any, mechanical agitation, through the reactor into one or more cooling zone(s). If more than one cooling zone is employed, the subsequent cooling zones can be of any design or configuration as would be adequate for the first cooling zone, and, subject to this condition, the design or configuration of the subsequent cooling zones may be the same as, or different from, that of the first cooling zone. The materials of construction for the cooling apparatus can include any materials compatible with the cooling media that provide sufficient heat transfer when located in intimate contact with exterior surfaces of the reactor. If the cooling apparatus is internal, the materials of construction can include any materials compatible with the reactants that provide sufficient heat transfer.

The materials of construction for the reactor can include any materials compatible with the reactants and the reactor may be configured in a closed loop, and may or may not contain static mixing element(s) or mechanical agitation of less than 5000 wafts per cubic meter of reactor volume. The optional static mixing element(s) can be formed from any material compatible with the reactants and capable of withstanding reaction conditions. There is no limit on the size of the reactor as long as the reactor is designed with sufficient cooling capacity to maintain the desired reaction temperature.

The nozzles used for the introduction of $F_2$ and $NH_3$ and the pipes used for withdrawal of $NF_3$ and AAF can be formed from any material compatible with the reactants and the product and co-products. A small amount of added mechanical mixing may be utilized in accordance with the method described here in (up to about 5000 wafts per cubic meter of reactor volume) but without vigorous mixing. Any cooling media sufficient to remove the heat of reaction is satisfactory.

The rate of reactant flow is dependent upon the rate of $NH_3$ addition to the liquid AAF, and the temperature differential, if any, on opposite sides or spaced lengths of the reactor. The rate of $NH_3$ addition controls the molar ratio of HF to $NH_3$ in the AAF (a molar ratio of $NH_3$ to HF of 1:2.28-1:2.55) and the rate of consumption of F2. The reactor operates at a pressure of 4 to 5 kilograms per square centimeter.

Meanwhile, the use of static mixing element(s) increases the reaction efficiency, but lowers the flow rate (because of the hydraulic resistance posed by the static mixing element(s)). Any number of static mixing elements may be used, the only limitation on the maximum number being the hydraulic resistance to the rate of flow of the reactants. The number of static mixing element(s) is determined by balancing the hydraulic resistance with the desired flow rate to achieve optimal conversion and selectivity to $NF_3$. The static mixing elements can be constructed using any material compatible with the reactants and the reaction conditions and, typically, will be made from a metal or alloy such as Hastelloy C, Inconel 600, Stainless steels 316 or 304, or carbon steel.

For a given rate of introduction of $F_2$, the rate of introduction of $NH_3$ must be regulated to maintain the specified acidity of the AAF to obtain the highest $NF_3$ selectivity. The rate of introduction of $NH_3$ thus controls reaction temperature and flow rate.

EXAMPLES

Example 1

Experiment showing the effect on $NF_3$ selectivity and yield of a less acidic AAF reactant ($NH_4Fx$ HF where the ratio of $NH_3$ to HF is approximately 1:2.34-1:2.40) in the static reactor claimed in this invention versus the molar ratio of $NH_3$ to HF used in Method 1 and the '285 patent (approximately 1:2.55 or greater, and preferably 1:2.65 or 1:2.85 or greater).

A stainless steel (SUS 316), closed loop reactor with an approximate volume of 0.616 cubic meters and 8" inner diameter was charged with ammonium bifluoride, $NH_4HN F_2$. The reactor was fitted with external cooling jackets, an $F_2$ inlet tube at point A on the diagram (the drawing), and an $NH_3$ inlet tube at point B on the drawing. $F_2$ was introduced through the inlet tube at point A on the drawing at a rate of approximately 23.5 kg/hr and $NH_3$ was introduced at point B on the drawing as necessary to maintain a molar ratio of $NH_3$ to HF of approximately 1:2.34-1:2.40, optimally approximately 1:2.345. The reactor operated at 4 to 5 kilograms per square centimeter.

Coolant was fed through the external cooling jackets (D to E on the drawing and F to G on the drawing) to maintain an operating temperature approximately 5° C. higher than the melting point of the AAF, but in all cases less than approximately 140° C., typically approximately 120° C. to 137° C.

$NF_3$, together with un-reacted HF, $NH_3$ and $F_2$, was withdrawn from point H on the drawing. $NH_4F$ was withdrawn from point C on the drawing. The following results were obtained:

| % $NF_3$ Yield | % $F_2$ Conversion | % $NF_3$ Selectivity |
| --- | --- | --- |
| 80.4 | 98 | 82 |
| 88.7 | 98.5 | 90 |
| 91.1 | 99 | 92 |
| 77.6 | 97 | 80 |

The $NF_3$ yield is determined by gas chromatography relative to the total quantity of $F_2$ fed to the reactor and the conversion is based on the amount of un-reacted $F_2$ measured in the exit stream from the reactor.

Example 2

Experiment showing the effect of the use of static mixers on $NF_3$ selectivity and yield.

The reactor was designed and operated as described in Example 1, except that a number of static mixers were introduced to enhance selectivity and yield. The static mixers were placed between points A and B on the drawing across approximately 30%-40% of the length of the reactor. The following results were obtained: TABLE-US-00002 Number of Static HF wt % $NF_3$% $F_2$% $NF_3$ Mixers % Yield Conversion Selectivity 0 42 75.06 92.8 75.06 10 42 92.6 99.6 92.7

The results show that the addition of static mixers dramatically improves selectivity and yield to levels that meet or exceed those achieved by the prior art without the energy cost of agitation (up to 35,000 watts per cubic meter), and without the mechanical complexity, high corrosion rates and increased operational cost of an agitated reactor.

Example 3

Experiment showing the effect on reactor diameter on $NF_3$ selectivity and yield.

Two reactors were designed and operated as described in Example 2. One reactor had a volume of 0.616 cubic meters and an inner diameter of 8 inches, and the other had a volume of 0.231 cubic meters and an inner diameter of 3 inches. The operational parameters were as described in Examples 1 and 2. The following results were obtained: TABLE-US-00003 Diameter of Reactor % $NF_3$% $F_2$% $NF_3$ (inches) Yield Conversion Selectivity 3 inches 73.5-76.4 98.5 75-78 8 inches 91.1 99.6 92.7

The results show that increased reactor diameter dramatically improves selectivity and yield to levels well in excess of those achieved by the prior art.

The $F_2$ flows into the reactor through inlet A, and the $NH_3$ is added through inlet B, where both gaseous reactants come into contact in the liquid AAF that fills the reactor. The static mixing elements are located between inlets A and B across approximately 30%-40% of the length of the reactor.

In the preferred embodiment, the reaction vessel may be disposed horizontally, or vertically as shown in the drawing, and can be of essentially any dimensions, depending upon the flow rate of reactants into the reactor inlets A and B, particularly the flow rate of $NH_3$ through inlet B, which is maintained at a rate sufficient to maintain the desired $NH_3$ to HF molar ratio.

The $F_2$ and $NH_3$ react with the molten, low acidity AAF within the reactor and flow, together with reaction products, including $NF_3$, across the static mixing elements between inlets A and B.

In the preferred embodiment, cooling zones (example: D-H and F-G on the drawing) are reactor-external coolant-carrying jacket(s) partially or totally encircling the reactor. The coolant-carrying jacket(s) carry a coolant liquid, e.g., water, having a temperature sufficiently below the temperature of the liquid AAF, the reactants and the reaction products to remove sufficient heat of reaction in the cooling zones to maintain (i) the desired reaction temperature in the vicinity of the static mixing elements, and (ii) any necessary temperature differential to maintain the desired rate of flow of liquid AAF, the reactants and the reaction products across the static mixing elements.

The AAF is removed from the reactor, together with excess HF, at outlet C, and the ABF is later separated from AAF and sold. The HF is separated from AAF, recovered and can be fed to an electrolytic cell to produce $F_2$. The gaseous $NF_3$ product is removed from the reactor at $NF_3$ outlet H together with HF and any gaseous byproducts. The $NF_3$ product is isolated and purified using conventional techniques.

DETAILED DESCRIPTION OF THE INVENTION

The preferred embodiment of the method and apparatus for producing $NF_3$ set forth in the summary above is a closed-loop, stainless steel reactor of approximately 0.616 cubic meters with an inner diameter of approximately 8 inches employing one or more static mixing elements, preferably about 8 to 10 static mixing elements, between points A and B shown on the drawing across approximately 30%-40% of the length of the reactor, operating at a temperature of approximately 5° C. higher than the melting point of the AAF, but in all cases less than approximately 140° C., optimally, approximately 120° C. to 137° C. The reactor operates at a pressure of 4 to 5 kilograms per square centimeter.

$F_2$ is introduced at point A on the drawing. $NH_3$ (ideally, high purity anhydrous ammonia) is introduced at point B of the drawing. The static mixing elements, optimally between 8 and 10, are located between points A and B on the drawing across approximately 30%-40% of the length of the reactor. Optimally, the static mixing elements are constructed of stainless steel or carbon steel. Both gaseous reactants are introduced using nozzles that provide sufficient surface area for the desired reactions to take place.

$F_2$ is introduced at a rate of approximately 24 kg/hr and $NH_3$ is introduced as necessary to maintain a molar ratio of $NH_3$ to HF of 1:2.28-1:2.46, preferably 1:2.34 to 1:2.40 and, more preferably, approximately 1:345. Coolant is fed through the external cooling jackets to maintain an operating temperature of approximately 5° C. higher than the melting point of the AAF, but in all cases less than approximately 140° C., preferably approximately 120° C. to 137° C.

The heat of reaction is removed, as necessary, from opposite sides of reactor to maintain optimal operating temperature and, if necessary, to supplement (through temperature differential) the flow of reactants, reaction products and molten AAF reaction media across the static mixing element(s). Ordinarily however, reactant flow rate is maintained by thermal conduction or siphon and controlled by the rate of $NH_3$ addition, which is determined by the quantity necessary to maintain the desired molar ratio of $NH_3$ to HF.

I claim:

1. A method of manufacturing $NF_3$ comprising reacting $NH_3$ with $F_2$ in and with molten Ammonium Acid Fluoride with a molar ratio of $NH_3$ to HF of 1:2.28 to 1:2.55 within a closed loop reactor with one or more spaced cooling zones, in which the reactants are conveyed by thermal conduction or siphon, but with essentially no mechanical agitation.

2. The method of claim 1, including continuous flow of reactants and reaction products within the closed loop.

3. The method of claim 1 or 2 wherein the reactor is annular or rectangular in shape.

4. The method of claim 1 or 2 wherein one or more static mixing element(s) is disposed within the reactor.

5. The method of claim 4 where the number of static mixing elements is 8 to 10.

6. The method of claim 1 or 2 where the reactor operates under pressure of 10 kilograms per square centimeter or less.

7. The method of claim 6 where the reactor operates under pressure of 4 to 5 kilograms per square centimeter.

8. The method of claim 4, wherein differential cooling along the reactor provides circulation of the reactants by thermal conduction or siphon across the static mixing element(s).

9. The method of claim 1 or 2 where the reaction is performed with a ratio of $NH_3$ to HF of 1:2.34 to 1:2.46.

10. The method of claim 1 or 2 where the reaction is performed with a ratio of $NF_3$ to HF of about 1:2.345.

11. The method of claim 1 or 2 where the reaction is performed in a continuous manner with the $NH_3$ continuously added such that the ratio of $NH_3$ to HF is maintained at 1:2.28 to 1:2.55.

12. The method of claim 11 wherein the ratio of $NH_3$ to HF is maintained at 1:2.34-1:2.40.

13. The method of claim 12 wherein the ratio of $NH_3$ to HF is maintained at approximately 1:2.345.

14. The method of claim 1 or 2 where the reaction is conducted at a temperature approximately 5° C. higher than the melting point of the Ammonium Acid Fluoride, but less than about 140° C.

15. The method of claim 1 or 2 where the reaction is conducted at a temperature between 120° C. and 137° C.

16. The method of claim 1 or 2 wherein the $NH_3$ and the $F_2$ are introduced on a same side of a static mixing element.

17. The method of claim 1 or 2 wherein the $NH_3$ and the $F_2$ are introduced on opposite sides of a static mixing element.

18. The method of claim 1 or 2, wherein $F_2$ and/or $NH_3$ is fed to the reactor through a conduit or nozzle.

19. The method of claim 1 or 2 where thermal conduction or siphon of the reactants is supplemented by mechanical agitation of 5000 watts/cubic meter of reactor volume or less.

20. The method of-claim 1 or 2 where the reactor is constructed of stainless steel.

21. The method of claim 4 where the static mixing elements are constructed of carbon steel.

22. The method of claim 4, wherein differential cooling on opposite sides of the static mixing element removes exothermic heat of reaction and facilitates movement of the molten Ammonium Acid Fluoride reactant by thermal conduction or siphon.

23. The method of claim 1 or 2, wherein $NF_3$, ammonium bifluoride, HF and unreacted $F_2$ are continuously withdrawn from the closed loop reactor.

* * * * *